(12) United States Patent
Genly

(10) Patent No.: US 7,006,973 B1
(45) Date of Patent: Feb. 28, 2006

(54) PROVIDING INFORMATION IN RESPONSE TO SPOKEN REQUESTS

(75) Inventor: Christopher H. Genly, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 547 days.

(21) Appl. No.: 09/494,796

(22) Filed: Jan. 31, 2000

(51) Int. Cl.
*G10L 21/00* (2006.01)
*G10L 15/18* (2006.01)
*G06F 17/27* (2006.01)

(52) U.S. Cl. ............................ 704/275; 704/257; 704/9
(58) Field of Classification Search ................ 704/231, 704/251, 257, 270, 272, 275, 9
See application file for complete search history.

(56) References Cited

U.S. PATENT DOCUMENTS 5,265,014 A * 11/1993 Haddock et al. ............... 704/9
6,314,398 B1 * 11/2001 Junqua et al. ............. 704/257

* cited by examiner

*Primary Examiner*—Angela Armstrong
(74) *Attorney, Agent, or Firm*—Trop, Pruner & Hu, P.C.

(57) ABSTRACT

A system allows a user to obtain information and to make selections using conversational speech. The system includes a speech recognizer that recognizes spoken requests for television programming information. A speech synthesizer may generate spoken responses to the spoken requests for information. A user may use a voice user interface as well as a graphical user interface to interact with the system to facilitate selections.

39 Claims, 11 Drawing Sheets

US 7,006,973 B1

PROVIDING INFORMATION IN RESPONSE TO SPOKEN REQUESTS

BACKGROUND

This invention relates generally to providing information in response to spoken requests.

Electronic programming guides provide a graphical user interface on a television display for obtaining information about television programming. Generally, an electronic programming guide provides a grid-like display which lists television channels in rows and programming times corresponding to those channels in columns. Thus, each program on a given channel at a given time is provided with a block in the electronic programming guide. The user may select particular programs for viewing by mouse clicking using a remote control on a highlighted program in the electronic programming guide.

While electronic programming guides have a number of advantages, they also suffer from a number of disadvantages. For one, as the number of television programs increases, the electronic programming guides become somewhat unmanageable. There are so many channels and so many programs that providing a screen sized display of the programming options becomes unworkable.

In addition, the ability to interact remotely with the television screen through a remote control is somewhat limited. Basically, the selection technique involves using a remote control to move a highlighted bar to select the desired program. This is time consuming when the number of programs is large.

Thus, there is a continuing need for a better way to provide information in response to spoken requests.

DETAILED DESCRIPTION

Figure 1:
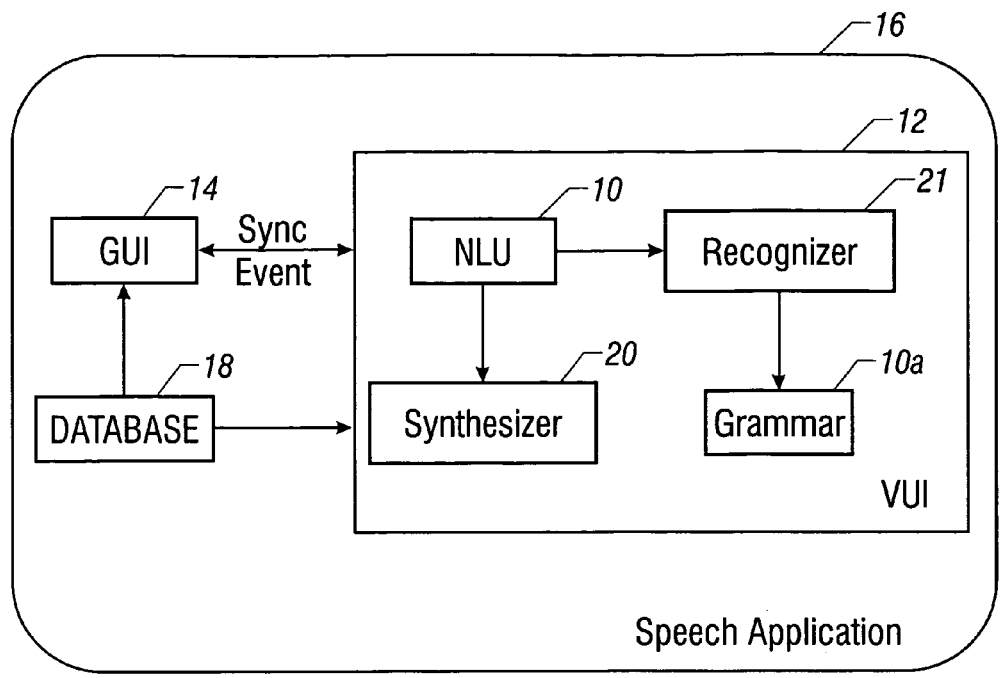
FIG. 1 is a schematic depiction of software modules utilized in accordance with one embodiment of the present invention.

An application may respond to conversational speech, with spoken or visual responses including using graphical user interfaces, in accordance with one embodiment of the present invention. In some embodiments of the present invention, a limited domain may be utilized to increase the accuracy of speech recognition. A limited or small domain allows focused applications to be implemented wherein the recognition of speech is improved because the vocabulary is limited.

While the present invention is illustrated using and an electronic programming guide application, it is not limited to any particular application.

Instead, it may be applied in a myriad of applications that benefit from speech recognition.

A variety of techniques may be utilized for speech recognition. However, in some embodiments of the present invention, the process may be simplified by using surface parsing. In surface parsing questions or statements are handled separately and there is no movement to convert questions into the same subject, verb, object order as a statement. As a result, conventional, commercially available software may be utilized for some aspects of speech recognition with surface parsing. However, in some embodiments of the present invention, deep parsing with movement may be more desirable.

As used herein, the term "conversational" as applied to a speech responsive system involves the ability of the system to respond to broadly or variously phrased requests, to use conversational history to develop the meaning of pronouns, to track topics as topics change and to use reciprocity. Reciprocity is the use of some terms that were used in the questions as part of the answer.

In some embodiments of the present invention, a graphical user interface may be utilized which may be similar to conventional electronic programming guides. This graphical user interface may include a grid-like display of television channels and times. In other embodiments, either no graphical user interface at all may be utilized or a more simplified graphical user interface may be utilized which is narrowed by the spoken requests that are received by the system.

In any case, the system uses a voice user interface (VUI) which interfaces between the spoken request for information from the user and the system. The voice user interface and a graphical user interface advantageously communicate with one another so that each knows any inputs that the other has received.

That is, if information is received from the graphical user interface to provide focus to a particular topic, such as a television program, this information may be provided to the voice user interface to synchronize with the graphical user interface. This may improve the ability of the voice user interface to respond to requests for information since the system then is fully cognizant of the context in which the user is speaking.

The voice user interface may include a number of different states including the show selected, the audio volume, pause and resume and listen mode. The listen mode may include three listening modes: never, once and always. The never mode means that the system is not listening and the speech recognizer is not running. The once mode means that the system only listens for one query. After successfully recognizing a request, it returns to the never mode. The always mode means that the system will always listen for queries. After answering one query, the system starts listening again.

A listen state machine utilized in one embodiment of the present invention may reflect whether the system is listening to the user, working on what the user has said or has rejected what the user has said. A graphical user interface may add itself as a listener to the listen state machine so that it may reflect the state to the user. There are four states in the listen state machine. In the idle state, the system is not listening. In the listening state, the system is listening to the user. In the working state, the system has accepted what the user has said and is starting to act on it. In the rejected state, what the user said has been rejected by the speech recognition engine.

The state machine may be set up to allow barge in. Barge in occurs when the user speaks while the system is operating. In such case, when the user attempts to barge in because the user knows what the system is going to say, the system yields to the user.

Referring to FIG. 1, the system software may include an application 16 that may be an electronic programming guide application in one embodiment of the present invention. In the illustrated embodiment, the application 16 includes a voice user interface 12 and a graphical user interface 14. The application 16 may also include a database 18 which provides information such as the times, programs, genre, and subject matter of various programs stored in the database 18. The database 18 may receive inquiries from the voice user interface 12 and the graphical user interface 14. The graphical and voice user interfaces may be synchronized by synchronization events.

The voice user interface 12 may also include a speech synthesizer 20, a speech recognizer 21 and a natural language understanding (NLU) unit 10. In other embodiments of the present invention, output responses from the system may be provided on a display as text rather than as voice output responses from a synthesizer. The voice user interface 12 may include a grammar 10a which may utilized by the recognizer 21.

A state vector is a representation of the meaning of an utterance by a user. A state vector may be composed of a set of state variables. Each state variable has a name, a value and two flags. An in-context state vector may be developed by merging an utterance vector which relates to what the user said and a history vector. A history vector contains information about what the user said in the past together with information added by the system in the process of servicing a query. Thus, the in-context state vector may account for ambiguity arising, for example, from the use of pronouns. The ambiguity in the utterance vector may be resolved by resorting to a review of the history vector and particularly the information about what the user said in the past.

In any state vector, including utterance, history or in-context state vectors, the state variables may be classified as SELECT or WHERE variables (borrowing the terms SELECT and WHERE from the SQL database language). SELECT variables represent information a user is requesting. In other words, the SELECT variable defines what the user wants the system to tell the user. This could be a show time, length or show description, as examples.

WHERE variables represent information that the user has supplied. A WHERE variable may define what the user has said. The WHERE variable provides restrictions on the scope of what the user has asked for. Examples of WHERE variables include show time, channel, title, rating and genre.

The query "When is X-Files on this afternoon?" may be broken down as follows:
Request: When (from "When is X-Files on this afternoon?")
Title: X-Files
Part_of_day_range: afternoon The request (when) is the SELECT variable. The WHERE variables include the other attributes including the title (X-Files) and the time of day (afternoon).

The information to formulate responses to user queries may be stored in a relational database in one embodiment of the present invention. A variety of software languages may be used. By breaking a query down into SELECT variables and WHERE variables, the system is amenable to programming in well known database software such as Structured Query Language (SQL). SQL is standard language for relational database management systems. In SQL, the SELECT variable selects information from a table. Thus, the SELECT command provides the list of column names from a table in a relational database. The use of a WHERE command further limits the selected information to particular rows of the table. Thus, a bare SELECT command may provide all the rows in a table and the combination of a SELECT and a WHERE command may provide less than all the rows of a table, including only those items that are responsive to both the SELECT and the WHERE command. Thus, by resolving spoken queries into SELECT and WHERE variables, the programming may be facilitated in some embodiments of the present invention.

Figure 2:
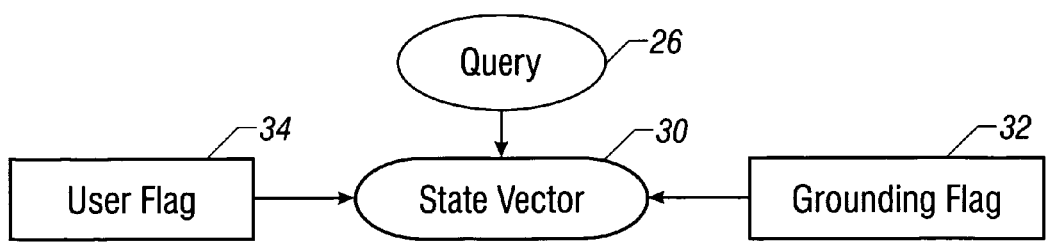
FIG. 2 is a schematic representation of the generation of a state vector from components of a spoken query and from speech generated by the system itself in accordance with one embodiment of the present invention.

Referring to FIG. 2 a user request or query 26 may result in a state vector 30 with a user flag 34 and a grounding flag 32. The user flag 34 indicates whether the state variable originated from the user's utterance. The grounding flag 32 indicates if the state variable has been grounded. A state variable is grounded when it has been spoken by the synthesizer to the user to assure mutual understanding. The VUI 12 may repeat portions of the user's query back to the user in its answer.

Grounding is important because it gives feedback to the user about whether the system's speech recognition was correct. For example, consider the following spoken interchange:

1. User: "Tell me about X-Files on Channel 58".
2. System: "The X-Files is not on Channel 50".
3. User: "Channel 58".
4. System: "On Channel 58, an alien . . . "

At utterance number 1, all state variables are flagged as from the user and not yet grounded. Notice that the speech recognizer confused fifty and fifty-eight. At utterance number 2, the system has attempted to repeat the title and the channel spoken by user and they are marked as grounded. The act of speaking parts of the request back to user lets the user know whether the speech recognizer has made a mistake. Grounding enables correction of recognition errors without requiring re-speaking the entire utterance. At utterance number 3, the user repeats "58" and the channel is again ungrounded. At utterance number 4, the system speaks the correct channel and therefore grounds it.

Figure 3:
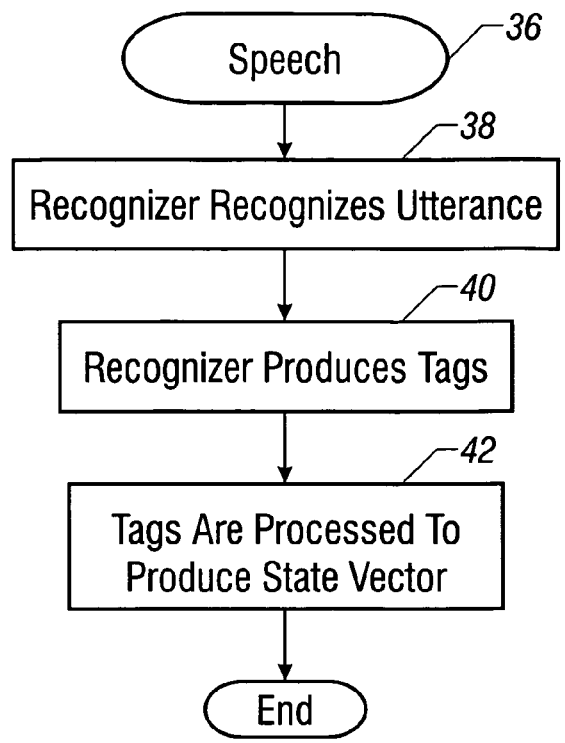
FIG. 3 is a flow chart for software for providing speech recognition in accordance with one embodiment of the present invention.

Turning next to FIG. 3, software 36 for speech recognition involves the use of an application program interface (API) in one embodiment of the present invention. For example, the JAVA speech API may be utilized in one embodiment of the present invention. Thus, as indicated in block 38, initially the API recognizes an utterance as spoken by the user. The API then produces tags as indicated in block 40. These tags are then processed to produce the state vector as indicated in block 42.

In one embodiment of the present invention, the JAVA speech API may be the ViaVoice software available from IBM Corporation. Upon recognizing an utterance, the JAVA speech API recognizer produces an array of tags. Each tag is a string. These strings do not represent the words the user spoke but instead they are the strings attached to each production rule in the grammar. These tags are language independent strings representing the meaning of each production rule. For example, in a time grammar, the tags representing the low order minute digit may include text which has no meaning to the recognizer. For example, if the user speaks "five", then the recognizer may include the tag "minute: 5" in the tag array.

Figure 4:
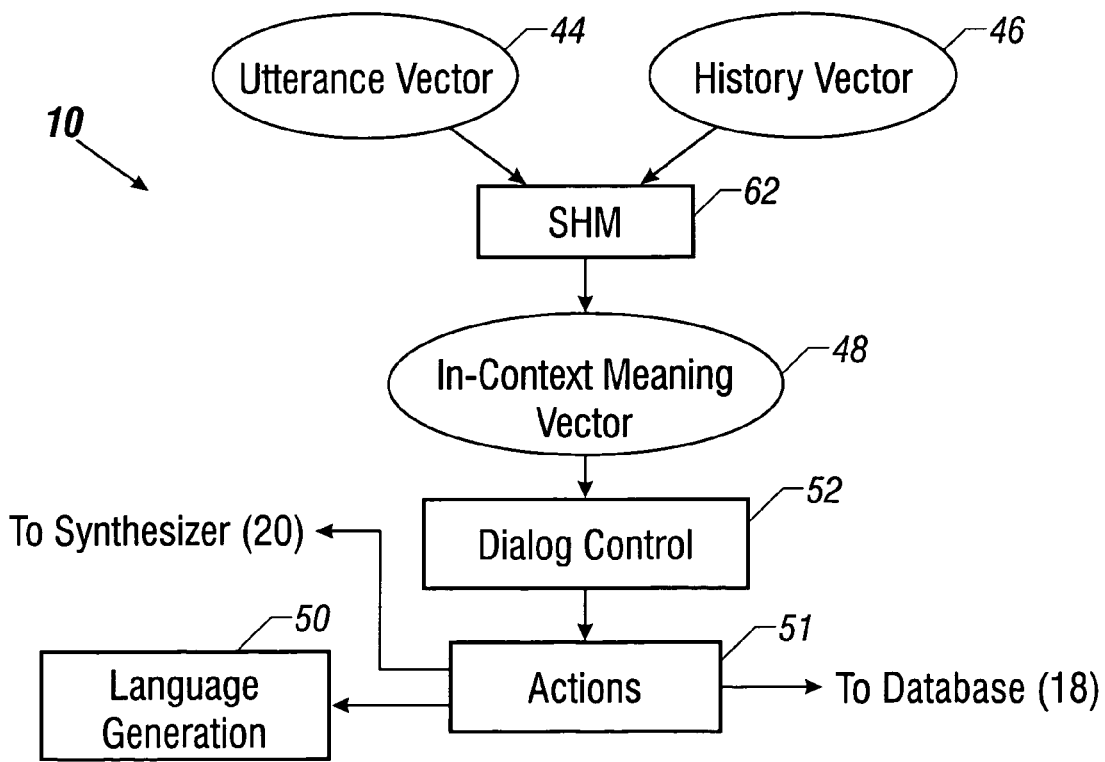
FIG. 4 is a schematic depiction of the operation of one embodiment of the present invention including the generation of in-context meaning and dialog control.

The natural language understanding (NLU) unit 10 develops what is called an in-context meaning vector 48 indicated in FIG. 4. This is a combination of the utterance vector 44 developed by the recognizer 21 together with the history vector 46. The history vector includes information about what the user said in the past together with information added by the system in the process of servicing a query. The utterance vector 44 may be a class file in an embodiment sing JAVA. The history vector 46 and a utterance vector 44 may be merged by structural history management software 62 to create the in-context meaning vector 48. The history, utterance and in-context meaning vectors are state vectors.

The in-context meaning vector 48 is created by decoding and replacing pronouns which are commonly used in conversational speech. The in-context meaning vector is then used as the new history vector. Thus, the system decodes the pronouns by using the speech history vector to gain an understanding of what the pronouns mean in context.

The in-context meaning vector 48 is then provided to dialog control software 52. The dialog control software 52 uses a dialog control file to control the flow of the conversation and to take certain actions in response to the in-context meaning vector 48.

These actions may be initiated by an object 51 that communicates with the database 18 and a language generation module 50. Prior to the language generation module 50, the code is human language independent. The module 50 converts the code from a computer format to a string tied to a particular human understood language, like English. The actions object 51 may call the synthesizer 20 to generate speech. The actions object 51 may have a number of methods (See Table I infra).

Figure 5:
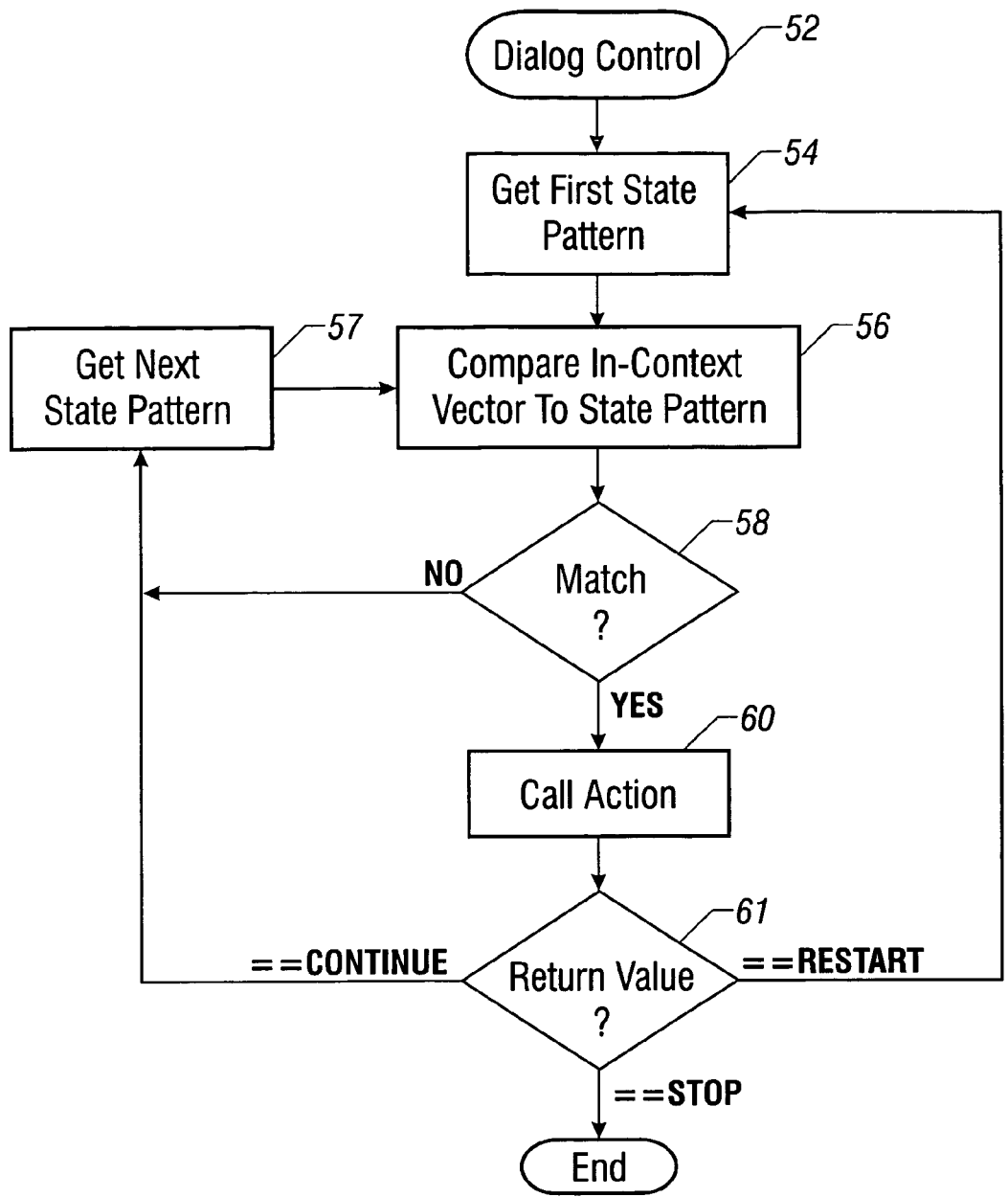
FIG. 5 is a flow chart for software for implementing dialog control in accordance with one embodiment of the present invention.

Thus, referring to FIG. 5, the dialog control software 52 initially executes a state control file by getting a first state pattern as indicated in block 54 in one embodiment of the present invention. Dialog control gives the system the ability to track topic changes.

The dialog control software 52 uses a state pattern table (see Table I below). Each row in the state pattern table is a state pattern and a function. The in-context meaning vector 48 is compared to the state pattern table one row at a time going from top to bottom (block 56). If the pattern in the table row matches the state vector (diamond 58), then the function of that row is called (block 60). The function is also called a semantic action.

Each semantic action can return one of three values: CONTINUE, STOP and RESTART as indicated at diamond 61. If the CONTINUE value is returned, the next state pattern is obtained, as indicated at block 57, and the flow iterates. If the RESTART value is returned, the system returns to the first state pattern (block 54). If the STOP value is returned, the system's dialog is over and the flow ends.

The action may do things such as speak to the user and perform database queries. Once a database query is performed, an attribute may be added to the state vector which has the records returned from the query as a value. Thus, the patterns consist of attribute, value pairs where the attributes in the state pattern table correspond to the attributes in the state vector. The values in the pattern are conditions applied to the corresponding values in the state vector.

TABLE I

| 1 | Request | Title | Channel | Time | nfound | function |
|---|---------|-------|---------|------|--------|----------|
| 2 | Help |  |  |  |  | giveHelp |
| 3 | Tv_on |  |  |  |  | turnOnTV |
| 4 | Tv_off |  |  |  |  | turnOffTV |
| 5 | tune |  | exists |  |  | tuneTV |
| 6 |  |  |  | not exists |  | defaultTime |
| 7 |  |  |  |  |  | checkDBLimits |
| 8 |  |  |  |  |  | queryDB |
| 9 |  |  |  |  | 0 | relaxConstraints |
| 10 |  |  |  |  | −1 | queryDB |
| 11 |  |  |  |  | 0 | saySorry |
| 12 |  |  |  |  | 1 | giveAnswer |
| 13 |  |  |  |  | >1 | giveChoice |

Thus, in the table above, the state patterns at lines 2–5 are basic functions such as help, turn the television on or off and tune the television and all return a STOP value.

In row six, the state pattern checks to see if the time attribute is defined. If not, it calls a function called defaultTime( ) to examine the request, determine what the appropriate time should be, set the time attribute, and return a CONTINUE value.

In row seven, the pattern is empty so the function checkDBLlimits( ) is called. A time in the user's request is checked against the time range spanned by the database. If the user's request extends beyond the end of the database, the user is notified, and the time is trimmed to fit within the database range. A CONTINUE value is returned.

Row eight calls the function queryDB( ). QueryDB( ) transforms the state vector into an SQL query, makes the query, and then sets the NFOUND variable to the number of records retrieved from the database. The records returned from the query are also inserted into the state vector.

At row nine a check determines if the query done in row eight found anything. For example, the user may ask, "When is the X-Files on Saturday?", when in fact the X-Files is really on Sunday. Rather than telling the user that the X-Files is not on, it is preferable that the system say that "the X-Files is not on Sunday, but is on Sunday at 5:00 p.m". To do this, the constraints of the user's inquiry must be relaxed by calling the function relaxConstraints( ). This action drops the time attribute from the state vector. If there were a constraint to relax, relaxconstraints( ) sets NFOUND to −1. Otherwise, it leaves it at zero and returns a CONTINUE value.

Row 10 causes a query to be repeated once the constraints are relaxed and returns a CONTINUE value. If there were no records returned from the query, the system gives up, tells the user of its failure in row 11, and returns a STOP value. In row 12 an answer is composed for the user if one record or show was found and a STOP value is returned.

In row 13, a check determines whether more than one response record exists. Suppose X-Files is on both channels 12 and 25. GiveChoice( ) tells the user of the multiple channels and asks the user which channel the user is interested in. GiveChoice( ) returns a STOP value (diamond 61, FIG. 5), indicating that the system's dialog turn is over. If the user tells the system a channel number, then the channel number is merged into the previous inquiry stored in history.

The system tracks topic changes. If the user says something that clears the history, the state pattern table simply responds to the query according to what the user said. The state pattern table responds to the state stored in the in-context vector.

Figure 6:
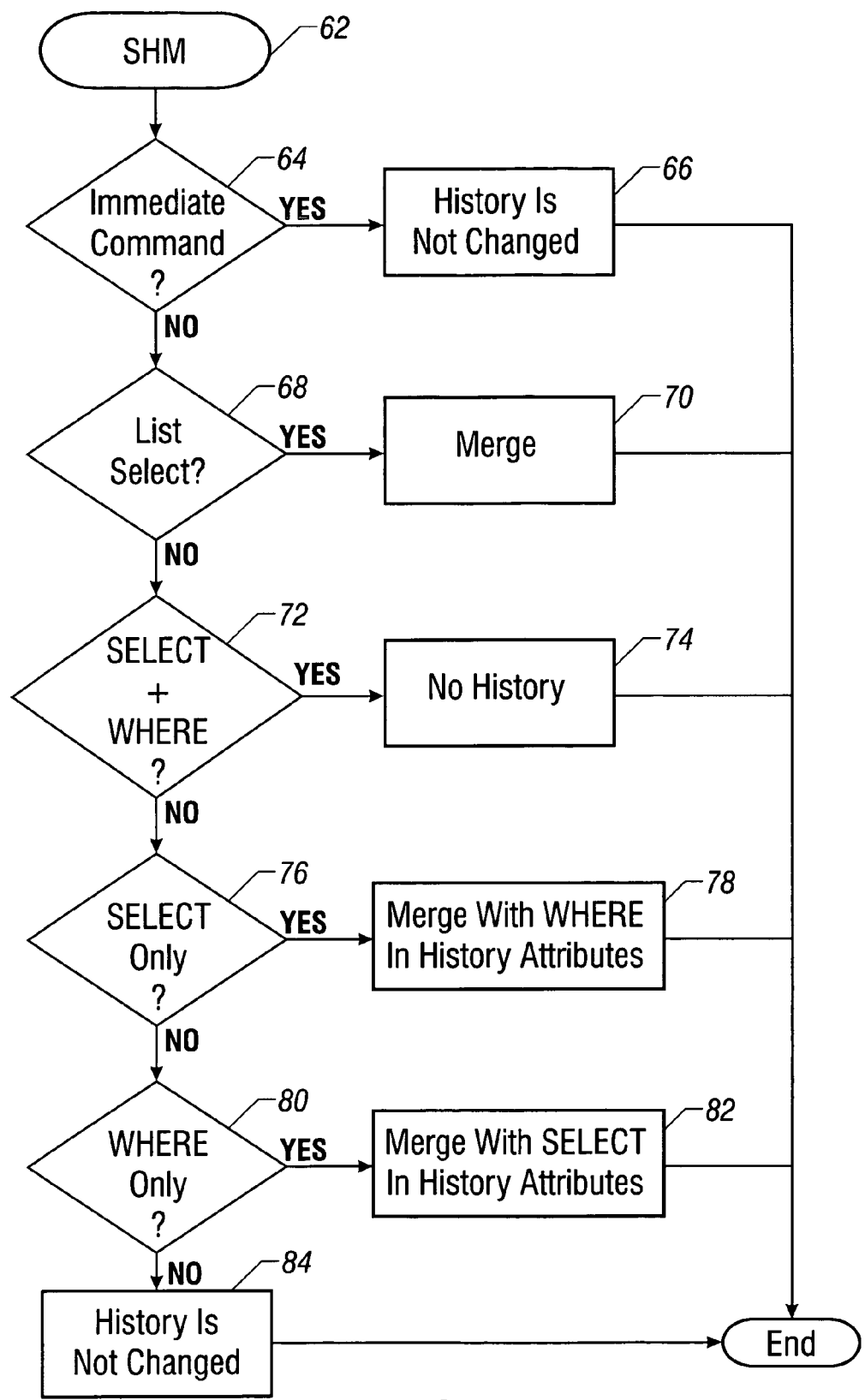
FIG. 6 is a flow chart for software for implementing structure history management in accordance with one embodiment of the present invention.

Turning next to FIG. 6, the software 62 implements structural history management (SHM). Initially the flow determines at diamond 64 whether an immediate command is involved. Immediate commands are utterances that do not query the database but instead demand immediate action. They do not involve pronouns and therefore do not require the use of structural history. An example would be "Turn on the TV". In some cases, an immediate command may be placed between other types of commands. The immediate command does not effect the history. This permits the following sequence of user commands to work properly:

1. "When is X-Files on",
2. "Turn on the TV",
3. "Record it".

The first sentence puts the X-Files show into the history. The second sentence turns on the television. Since it is an immediate command, the second sentence does not erase the history. Thus, the pronoun "it" in the record command (third sentence) can be resolved properly.

Thus, referring back to FIG. 6, if an immediate command is involved, the history is not changed as indicated in block 66. Next, a check at diamond 68 determines whether a list selection is involved. In some cases, a query may be responded to with a list of potential shows and a request that the user verbally select one of the listed shows. The system asks the user which title the user is interested in. The user may respond that it is the Nth title. If the user utterance selects a number from a list, then the system merges with history as indicated in block 70. Merging with history refers to an operation in which the meaning derived from the speech recognizer is combined with history in order to decode implicit references such as the use of pronouns.

Next, a check at diamond 72 determines whether the query includes both SELECT and WHERE variables. If so, history is not needed to derive the in-context meaning as indicated in block 74.

Otherwise, a check determines whether the utterance includes only SELECT (diamond 76) or only WHERE (diamond 80) variables. If only a SELECT variable is involved, the utterance vector is merged with the history vector (block 78).

Similarly, if the utterance includes only a WHERE variable, the utterance is merged with history as indicated in block 82. If none of the criteria set forth in diamonds 64, 68, 72, 76 or 80 apply, then the history is not changed as indicated in block 84.

As an example, assume that the history vector is as follows:
 Request: When (from "When is X-Files on this afternoon?")
 Title: X-Files
 Part_of_day_range: afternoon.

Thus the history vector records a previous query "When is X-Files on this afternoon?". Thereafter, the user may ask "What channel is it on?" which has the following attributes:
 Request: Channel (from "What channel is it on?")

Thus, there is a SELECT attribute but no WHERE attribute in the user's query. As a result, the history vector is needed to create an in-context or merged meaning as follows:
 Request: Channel (from "What channel is X-Files on this afternoon?")
 Title: X-Files
 Part_of_day_range: afternoon.

Notice that the channel request overwrote the when request.

As another example, assume the history vector includes the question "What is X-Files about?" which has the following attributes:
 Request: About (from "What is X-Files about?")
 Title: X-Files Assume the user then asks "How about Xena?" which has the following attributes:
 Title: Xena (from "How about Xena?")

The query results in an in-context meaning as follows when merged with the history vector:
 Request: About (from "What is Xena about?"
 Title: Xena.

Since there was no SELECT variable obtainable from the user's question, the SELECT variable was obtained from the historical context (i.e. from the history vector). Thus, in the first example, the WHERE variable was missing and in the second variable the SELECT variable was missing. In each case the missing variable was obtained from history to form an understandable in-context meaning.

If an utterance has only a WHERE variable, then the in-context meaning vector is the same as the history vector with the utterance's WHERE variable inserted into the history vector. If the utterance has only a SELECT variable, then the in-context meaning is the same as the history vector with the utterance's SELECT variable inserted into the history vector. If the utterance has neither a SELECT or a WHERE variable, then the in-context meaning vector is the same as the history vector. If the utterance has both parts, then the in-context meaning is the same as that of the utterance and the in-context meaning vector becomes the history vector.

Figure 7:
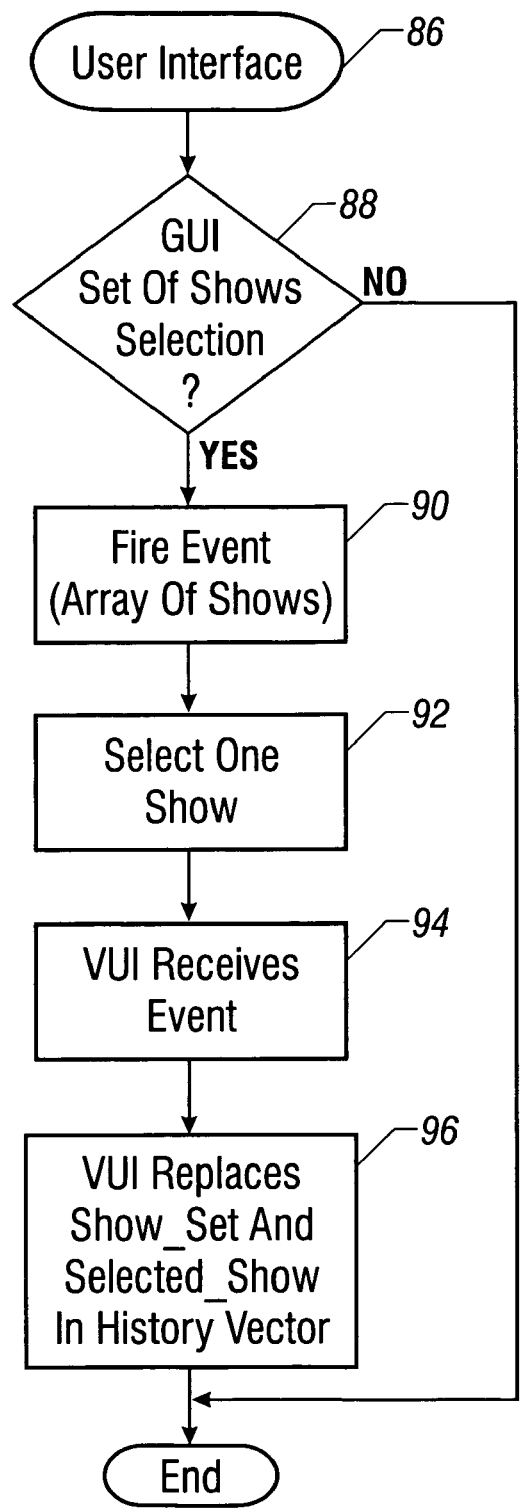
FIG. 7 is flow chart for software for implementing an interface between a graphical user interface and a voice user interface in accordance with one embodiment of the present invention.

The software 86, shown in FIG. 7, coordinates actions between the graphical user interface and the voice user interface in one embodiment of the invention. A show is a television show represented by a database record. A show is basically a database record with attributes for title, start time, end time, channel, description, rating and genre.

More than one show is often under discussion. A collection of shows is represented by a ShowSet. The SHOW_SET attribute is stored in the meaning vector under the SHOW_SET attribute. If only one show is under discussion, then that show is the SHOW_SET.

If the user is discussing a particular show in the SHOW_SET, that show is indicated as the SELECTED_SHOW attribute. If the attribute is −1, or missing from the meaning vector, then no show in the SHOW_SET has been selected.

When the voice user interface produces a ShowSet to answer a user's question, SHOW_SET and SELECTED_SHOW are set appropriately. When a set of shows is selected by the graphical user interface 14, it fires an event containing an array of shows. Optionally, only one of these shows may be selected. Thus, referring to diamond 88, if the user selects a set of shows, an event is fired as indicated in block 90. In block 92, one of those shows may be selected. When the voice user interface 12 receives the fired event (block 94), it simply replaces the values of SHOW_SET and SELECTED_SHOW (block 96) in the history vector with those of a synchronization event.

When the voice user interface 12 translates a meaning vector into the appropriate software language, the statement is cached in the history vector under the attributes. This allows unnecessary database requests to be avoided. The next time the history vector is translated, it is compared against the cached value in the history vector. If they match, there is no need to do the time consuming database query again.

The conversational model 100 (FIG. 8) implemented by the system accounts for two important variables in obtaining information about television programming: time and shows. A point in time may be represented by the a JAVA class calendar. A time range may be represented by a time range variable. The time range variable may include a start and end calendar. The calendar is used to represent time because it provides methods to do arithmetic such as adding hours, days, etc.

The time range may include a start time and end time either of which may be null indicating an open time range. In a state vector, time may be represented using attributes such as a WEEK_RANGE which includes last, this and next; DAY_RANGE which includes now, today, tomorrow, Sunday, Monday . . . , Saturday, next Sunday . . . , last Sunday . . . , this Sunday . . . ; PART_OF_DAY_RANGE which includes this morning, tonight, afternoon and evening; HOUR which may include the numbers one to twelve; MINUTE which may include the numbers zero to fifty-nine; and AM_PM which includes AM and PM.

Thus, the time attributes may be composed to reflect a time phase in the user's utterance. For example, in the question, "Is Star Trek on next Monday at three in the afternoon?" may be resolved as follows:
Request: When
Title: Star Trek
Day_Range: Next Monday
Part_of_Day_Range: Afternoon
Hour: 3

Since the state vector is a flat data structure in one embodiment of the invention, it is much simpler and uses simpler programming. The flat data structure is made up of attribute, value pairs. For example, in the query "When is X-Files on this afternoon?" the request is the "when" part of the query. The request is an attribute whose value is "when". Similarly, the query has a title attribute whose value is the "X-Files". Thus, each attribute, value pair includes a name and a value. The data structure may be simplified by ensuring that the values are simple structures such as integers, strings, lists or other database records as opposed to another state vector.

In this way, the state vector contains that information needed to compute an answer for the user. The linguistic structure of the query, such as whether it is a phrase, a clause or a quantified set, is deliberately omitted in one embodiment of the invention. This information is not necessary to compute a response. Thus, the flat data structure provides that information and only that information needed to formulate a response. The result is a simpler and more useful programming structure.

Figure 8:
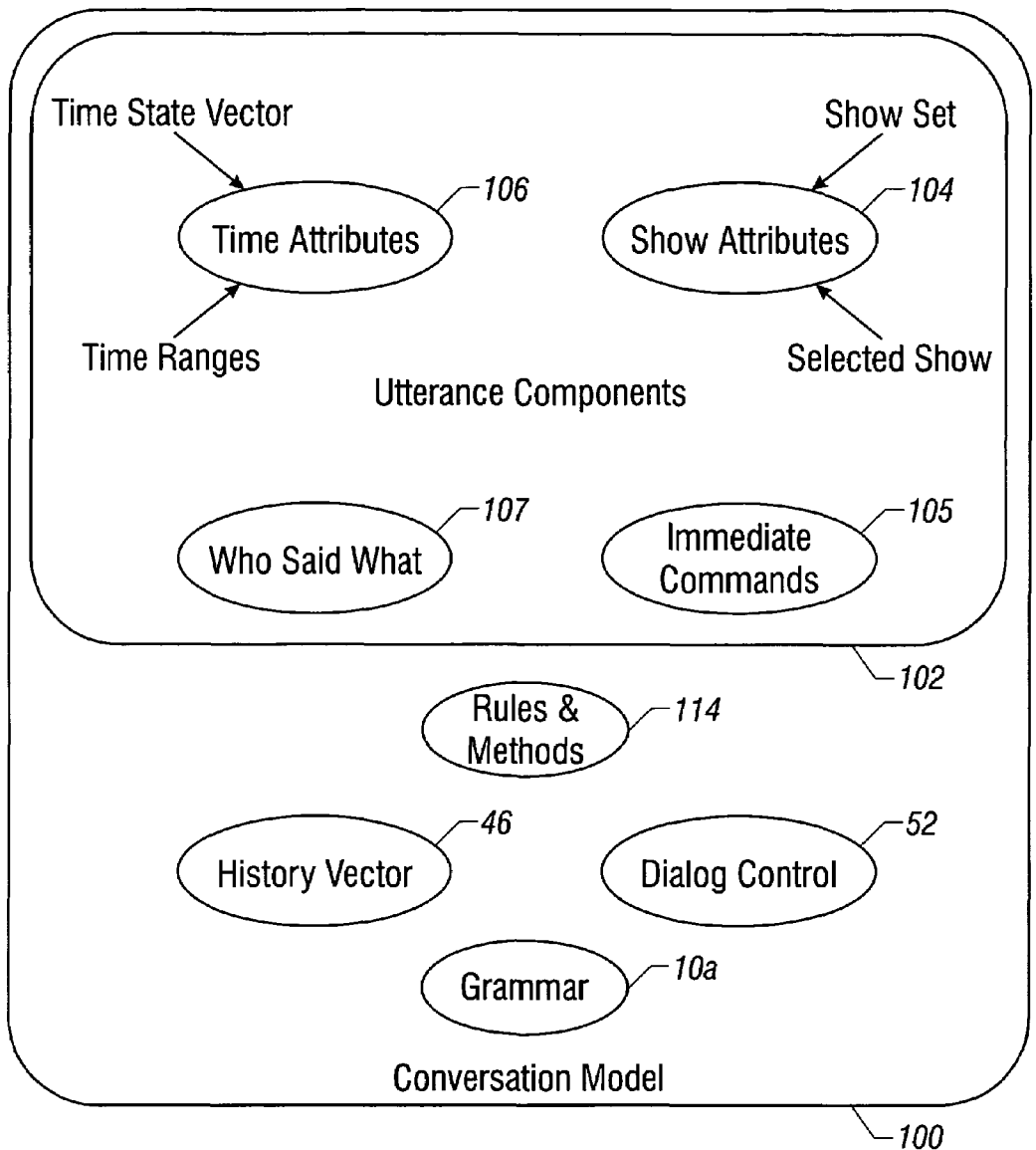
FIG. 8 is a conversation model implemented in software in accordance with one embodiment of the present invention.
Figure 8A:
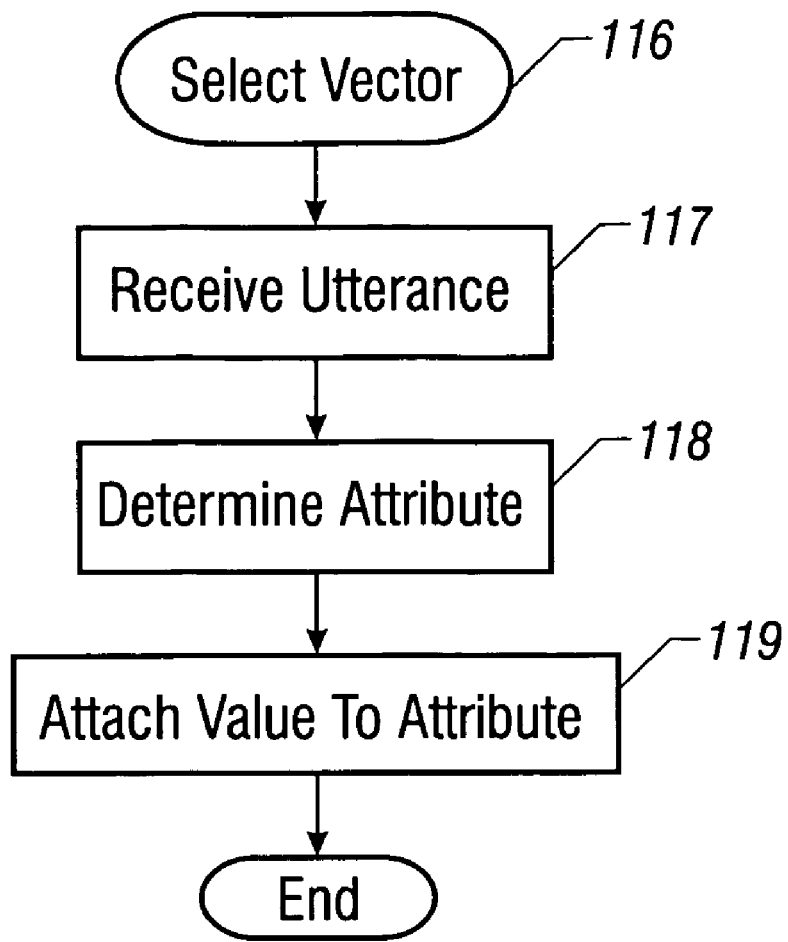
FIG. 8A is a flow chart for software for creating state vectors in one embodiment of the present invention.

The software 116 for creating the state vector, shown in FIG. 8A in accordance with one embodiment of the present invention, receives the utterance as indicated in block 117. An attribute of the utterance is determined as indicated in block 118. A non-state vector value is then attached to the attribute, value pair, as indicated in block 119.

Thus, referring again to FIG. 8, the conversation model 100 may include time attributes 106 which may include time ranges in a time state vector. Show attributes 104 may include a show set and selected show. The time attributes and show attributes are components of an utterance. Other components of the utterance may be "who said what" as indicated at 107 and immediate commands as indicated at 105. The conversation model may also include rules and methods 114 discussed herein as well as a history vector 46, dialog control 52 and a grammar 10a.

The methods and rules 114 in FIG. 8 may include a number of methods used by the unit 10. For example, a method SetSelected( ) may be used by the unit 10 to tell the voice user interface 12 what shows have been selected by the graphical user interface 14. The method Speak( ) may be used to give other parts of the system, such as the graphical user interface 14, the ability to speak.

If the synthesizer 20 is already speaking, then a Speak( ) request is queued to the synthesizer 20 and the method returns immediately.

The method SpeakIfQuiet( ) may be used by the unit 10 to generate speech only if the synthesizer 20 is not already speaking. If the synthesizer is not speaking, the text provided with the SpeakIfQuiet( ) method may be given to the synthesizer 20. If the synthesizer is speaking, then the text may be saved, and spoken when the synthesizer is done speaking the current text.

Figure 9:
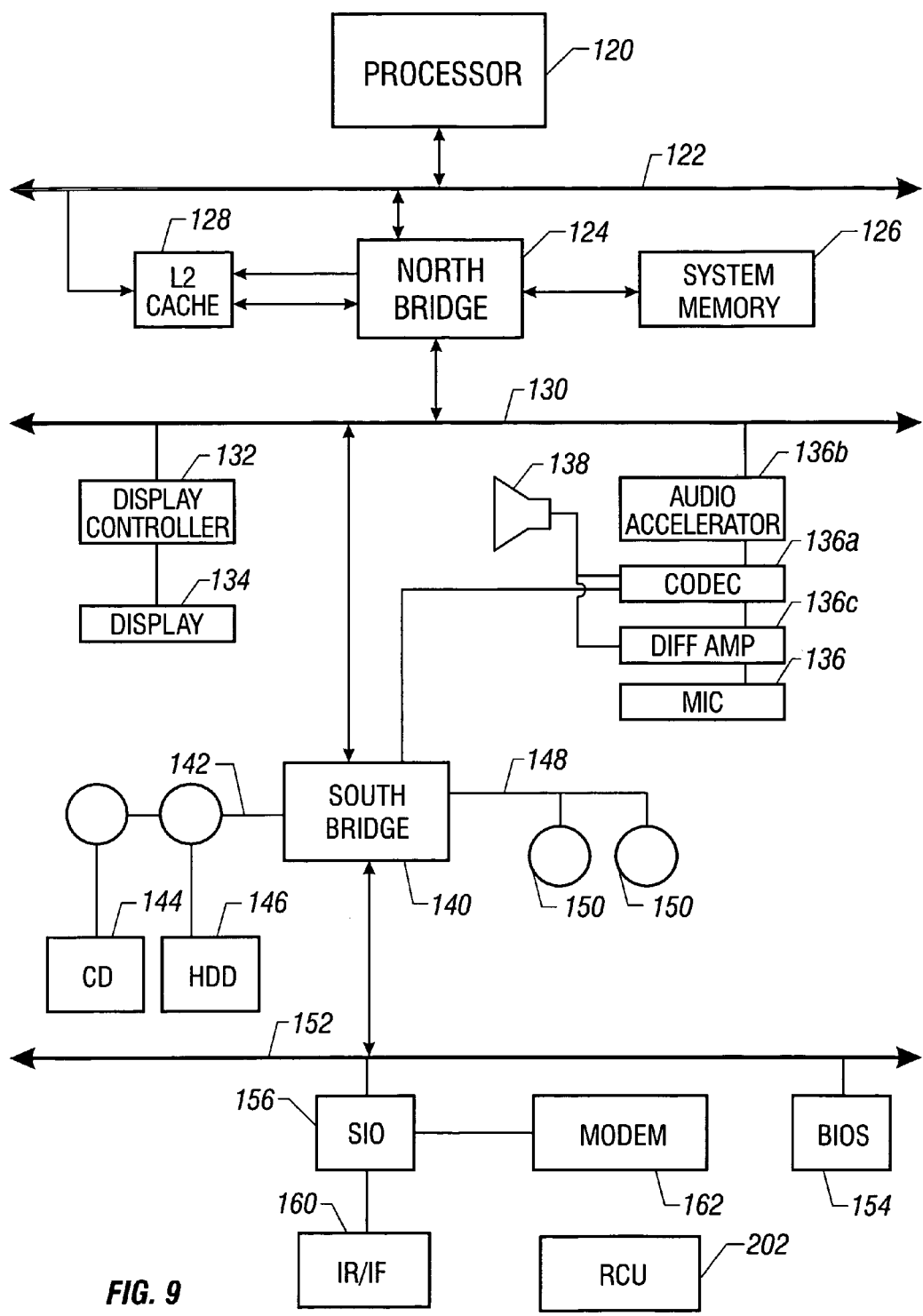
FIG. 9 is a schematic depiction of hardware for implementing one embodiment of the present invention.

One embodiment of a processor-based system for implementing the capabilities described herein, shown in FIG. 9, may include a processor 120 that communicates across a host bus 122 to a bridge 124, an L2 cache 128 and system memory 126. The bridge 124 may communicate with a bus 130 which could, for example, be a Peripheral Component Interconnect (PCI) bus in accordance with Revision 2.1 of the PCI Electrical Specification available from the PCI Special Interest Group, Portland, Oreg. 97214. The bus 130, in turn, may be coupled to a display controller 132 which drives a display 134 in one embodiment of the invention.

Figure 9A:
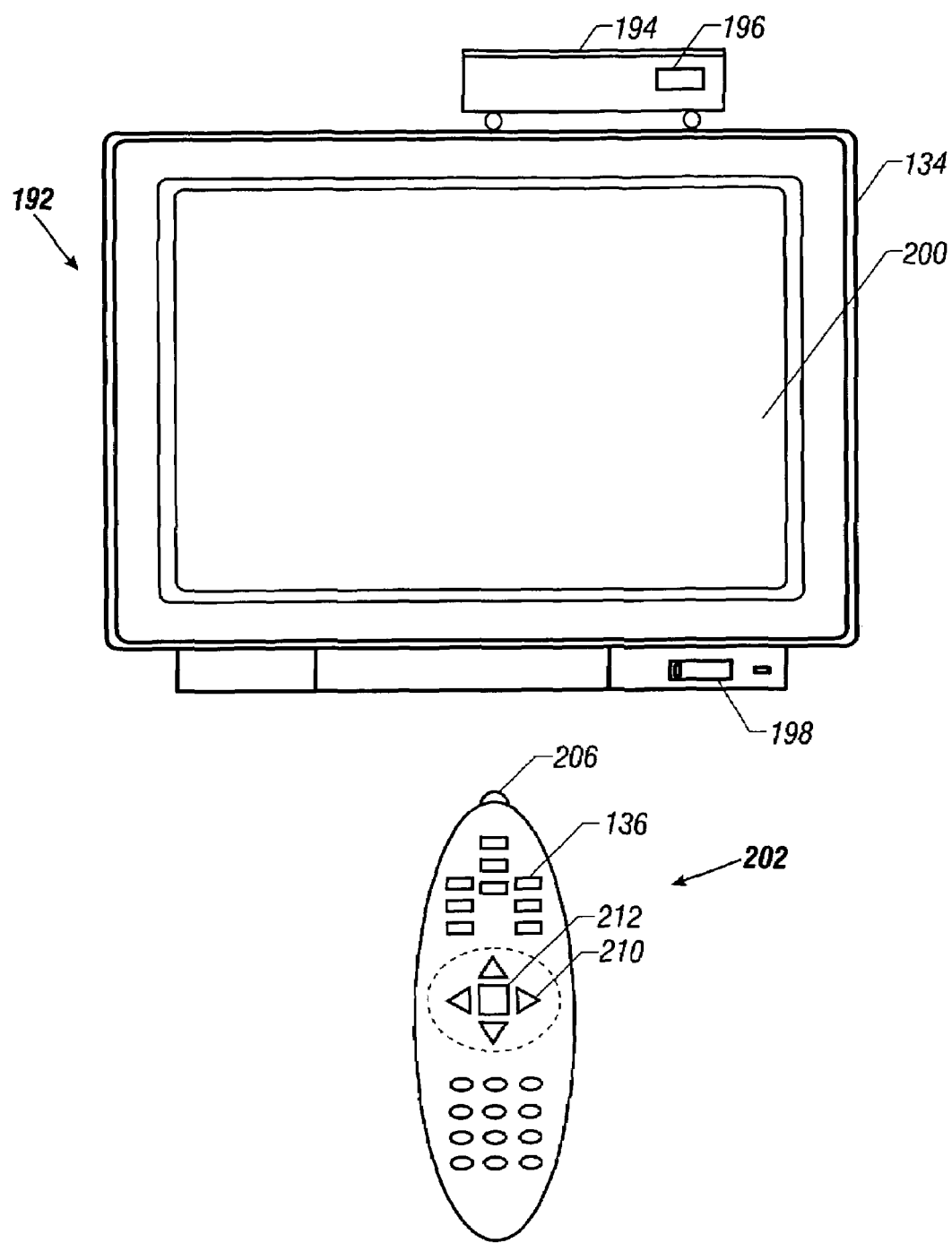
FIG. 9A is a front elevational view of one embodiment of the present invention.
Figure 10:
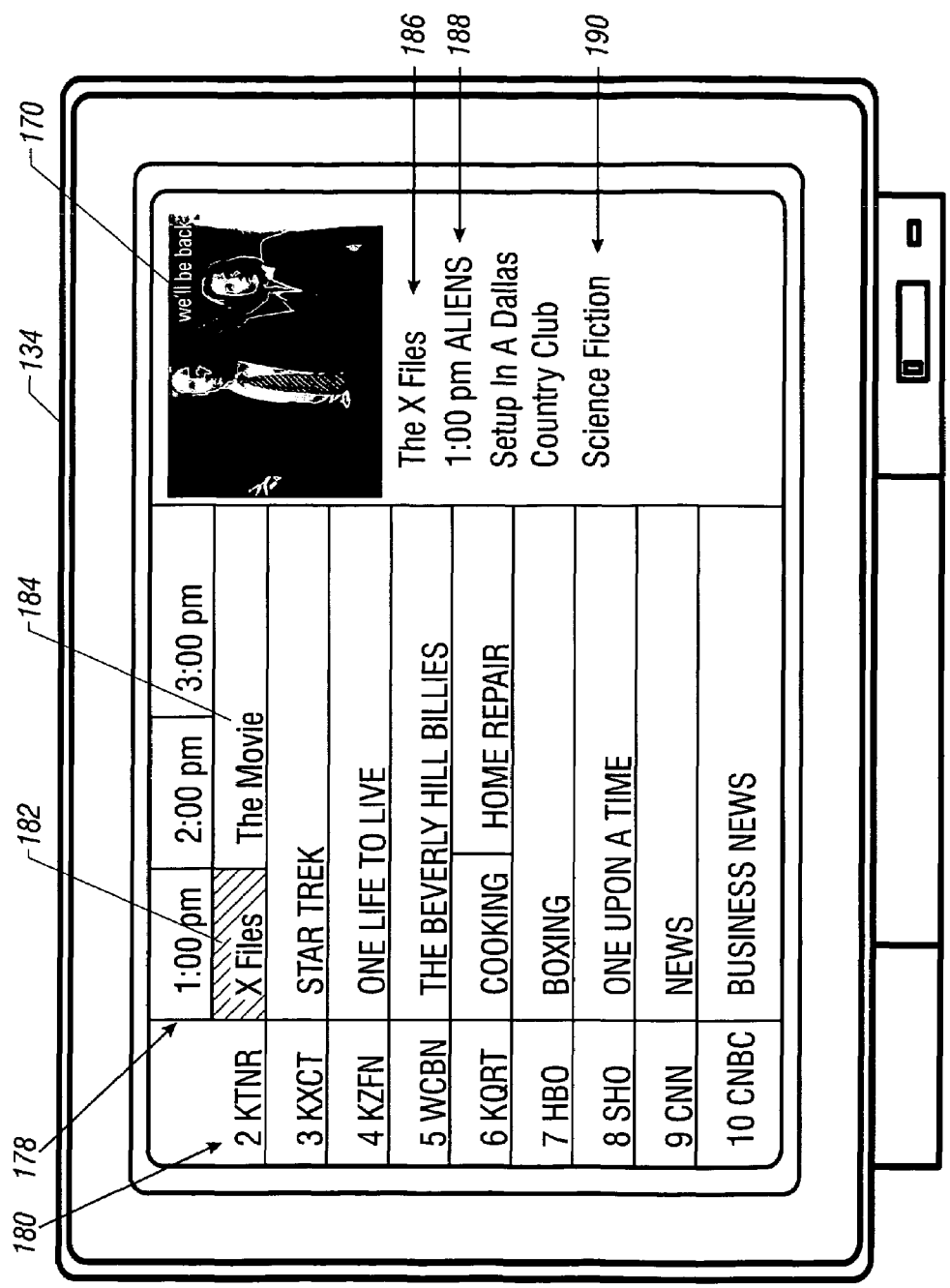
Figure 11:
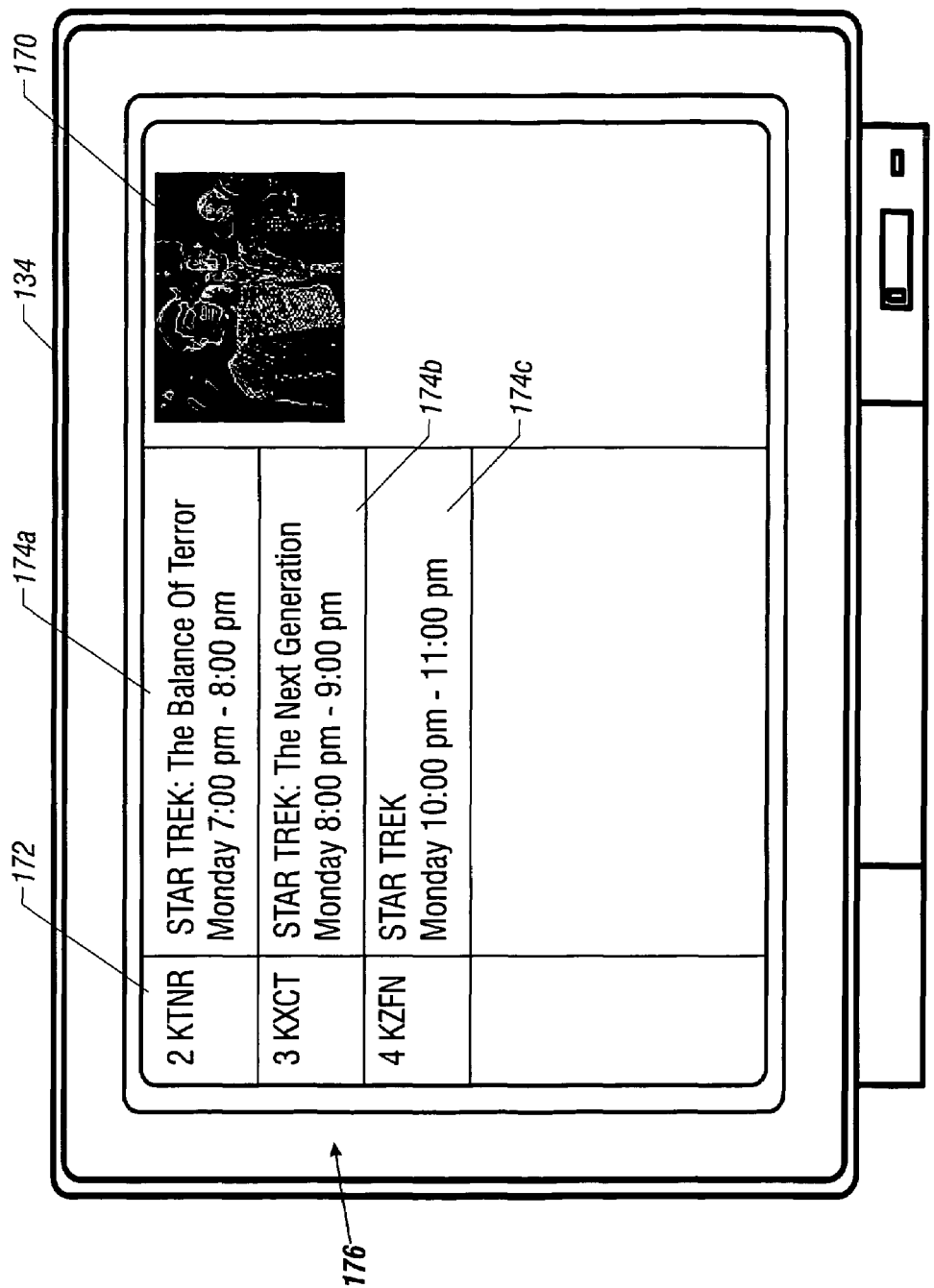

The display 134 may be a conventional television. In such case, the hardware system shown in FIG. 9 may be implemented as a set-top box 194 as shown in FIG. 9A. The set-top box 194 sits on and controls a conventional television display 134.

A microphone input 136 may lead to the audio codec (AC'97) 136a where it may be digitized and sent to memory through an audio accelerator 136b. The AC'97 specification is available from Intel Corporation (www.developer.intel.com/pc-supp/webform/ac97). Sound data generated by the processor 120 may be sent to the audio accelerator 136b and the AC'97 codec 136a and on to the speaker 138.

In some embodiments of the present invention, there may be a problem distinguishing user commands from the audio that is part of the television program. In some cases, a mute button may be provided, for example in connection with a remote control 202, in order to mute the audio when voice requests are being provided.

In accordance with another embodiment of the present invention, a differential amplifier 136c differences the audio output from the television signal and the input received at the microphone 136. This reduces the feedback which may occur when audio from the television is received by the microphone 136 together with user spoken commands.

In some embodiments of the present invention, a microphone 136 may be provided in a remote control unit 202 which is used to operate the system 192, as shown in FIG. 9A. For example, the microphone inputs may be transmitted through a wireless interface 206 to the processor-based system 192 and its wireless interface 196 in one embodiment of the present invention. Alternatively, the remote control unit 202 may interface with the television receiver 134 through its wireless interface 198.

The bus 130 may be coupled to a bus bridge 140 that may have an extended integrated drive electronics (EIDE) coupling 142 in and Universal Serial Bus (USB) coupling 148 (i.e., a device compliant with the Universal Serial Bus Implementers Form Specification, Version 1.0 (www.usb.org)). Finally, the USB connection 148 may couple to a series of USB hubs 150.

The EIDE connection 142 may couple to a hard disk drive 146 and a CD-ROM player 144. In some embodiments, other equipment may be coupled including a video cassette recorder (VCR), and a digital versatile disk (DVD) player, not shown.

The bridge 140 may in turn be coupled to an additional bus 152, which may couple to a serial interface 156 which drives an infrared interface 160 and a modem 162. The interface 160 may communicate with the remote control unit 202. A basic input/output system (BIOS) memory 154 may also be coupled to the bus 152.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An article comprising a medium for storing instructions that cause a processor-based system to:
   develop a first representation of a current user query;
   develop a second representation of a previous user query;
   determine whether the first representation includes only one of two types of variables, and if so, merge the first representation with the second representation to form a third representation; and
   determine whether the first representation includes only a where variable and in such case use the second representation to form a third representation and insert the where variable into the second representation.

2. The article of claim 1 further storing instructions that cause a processor-based system to determine whether the first representation has only a select variable, use the second representation to form a third representation and insert the select variable into the second representation.

3. The article of claim 1 further storing instructions that cause a processor-based system to determine whether neither a where or a select variable is contained in the first representation and in such case to make the in-third representation vector the same as second representation.

4. The article of claim 1 further storing instructions that cause a processor-based system to determine whether both a where variable and a select variable are contained in the first representation and if so, use the first representation to form the third representation and use the third representation as the second representation.

5. A method comprising:
   developing a first representation from a current user query;
   developing a second representation from a previous user query;
   determining whether said first representation includes only one of two variable types and if so, merging the first representation with the second representation to form the third representation; and
   determining whether the first representation includes only a where variable and in such case using the second representation as the third representation and inserting the where variable into the second representation.

6. The method of claim 5 including determining whether the first representation has only a select variable and if so, using the second representation as the third representation and inserting the select variable into the second representation.

7. The method of claim 5 including determining whether neither a where or a select variable is contained in the first representation and in such case, making the third representation the same as the second representation.

8. The method of claim 5 including determining whether both a where variable and a select variable are contained in the first representation and if so using the first representation to form the third representation and using the third representation as the second representation.

9. A system comprising:
   a processor; and
   a storage coupled to said processor, said storage storing software that develops a first representation from a current user query, develops a second representation from a previous user query, determines whether the first representation includes only one of two variable types and if so merges the first representation with the second representation to form a third representation, and determines whether the first representation includes only a where variable and in such case, uses the second representation as the third representation and inserts the where variable into the second representation.

10. The system of claim 9 wherein said software develops a state vector representing the meaning of a spoken query, said state vector formed of a attribute, value pair with a non-recursive data structure as said value.

11. The system of claim 9 including a speech recognizer and a speech synthesizer communicating with said software.

12. The system of claim 11 including a graphical user interface stored in said storage and synchronized to said software.

13. The system of claim 9 including an electronic programming guide application, said software creating a conversational speech responsive system.

14. The system of claim 9 wherein said system is a set-top box controlling a television receiver and implementing an electronic programming guide.

15. The system of claim 14 including a remote control unit coupled to said set-top box through a wireless interface.

16. An article comprising a medium for storing instructions that cause a processor-based system to:
   develop a first representation of a current user query;
   develop a second representation of a previous user query;
   determine whether the first representation includes only one of two types of variables, and if so, merge the first representation with the second representation to form a third representation; and
   determine whether the first representation has only a select variable, use the second representation to form a third representation and insert the select variable into the second representation.

17. The article of claim 16 further storing instructions that cause a processor-based system to determine whether the first representation includes only a where variable and in such case use the second representation to form a third representation and insert the where variable into the second representation.

18. The article of claim 16 further storing instructions that cause a processor-based system to determine whether neither a where or a select variable is contained in the first representation and in such case to make the in-third representation vector the same as second representation.

19. The article of claim 16 further storing instructions that cause a processor-based system to determine whether both a where variable and a select variable are contained in the first representation and if so, use the first representation to form the third representation and use the third representation as the second representation.

20. An article comprising a medium for storing instructions that cause a processor-based system to:
  develop a first representation of a current user query;
  develop a second representation of a previous user query;
  determine whether the first representation includes only one of two types of variables, and if so, merge the first representation with the second representation to form a third representation; and
  determine whether neither a where or a select variable is contained in the first representation and in such case to make the in-third representation vector the same as second representation.

21. The article of claim 20 further storing instructions that cause a processor-based system to determine whether the first representation includes only a where variable and in such case use the second representation to form a third representation and insert the where variable into the second representation.

22. The article of claim 20 further storing instructions that cause a processor-based system to determine whether the first representation has only a select variable, use the second representation to form a third representation and insert the select variable into the second representation.

23. The article of claim 20 further storing instructions that cause a processor-based system to determine whether both a where variable and a select variable are contained in the first representation and if so, use the first representation to form the third representation and use the third representation as the second representation.

24. An article comprising a medium for storing instructions that cause a processor-based system to:
  develop a first representation of a current user query;
  develop a second representation of a previous user query;
  determine whether the first representation includes only one of two types of variables, and if so, merge the first representation with the second representation to form a third representation; and
  determine whether both a where variable and a select variable are contained in the first representation and if so, use the first representation to form the third representation and use the third representation as the second representation.

25. The article of claim 24 further storing instructions that cause a processor-based system to determine whether the first representation includes only a where variable and in such case use the second representation to form a third representation and insert the where variable into the second representation.

26. The article of claim 24 further storing instructions that cause a processor-based system to determine whether the first representation has only a select variable, use the second representation to form a third representation and insert the select variable into the second representation.

27. The article of claim 24 further storing instructions that cause a processor-based system to determine whether neither a where or a select variable is contained in the first representation and in such case to make the in-third representation vector the same as second representation.

28. A method comprising:
  developing a first representation from a current user query;
  developing a second representation from a previous user query;
  determining whether said first representation includes only one of two variable types and if so, merging the first representation with the second representation to form the third representation; and
  determining whether the first representation has only a select variable and if so, using the second representation as the third representation and inserting the select variable into the second representation.

29. The method of claim 28 including determining whether the first representation includes only a where variable and in such case using the second representation as the third representation and inserting the where variable into the second representation.

30. The method of claim 28 including determining whether neither a where or a select variable is contained in the first representation and in such case, making the third representation the same as the second representation.

31. The method of claim 28 including determining whether both a where variable and a select variable are contained in the first representation and if so using the first representation to form the third representation and using the third representation as the second representation.

32. A method comprising:
  developing a first representation from a current user query;
  developing a second representation from a previous user query;
  determining whether said first representation includes only one of two variable types and if so, merging the first representation with the second representation to form the third representation; and
  determining whether neither a where or a select variable is contained in the first representation and in such case, making the third representation the same as the second representation.

33. The method of claim 32 including determining whether the first representation includes only a where variable and in such case using the second representation as the third representation and inserting the where variable into the second representation.

34. The method of claim 32 including determining whether the first representation has only a select variable and if so, using the second representation as the third representation and inserting the select variable into the second representation.

35. The method of claim 32 including determining whether both a where variable and a select variable are contained in the first representation and if so using the first representation to form the third representation and using the third representation as the second representation.

36. A method comprising:
  developing a first representation from a current user query;
  developing a second representation from a previous user query;
  determining whether said first representation includes only one of two variable types and if so, merging the first representation with the second representation to form the third representation; and determining whether both a where variable and a select variable are contained in the first representation and if so using the first representation to form the third representation and using the third representation as the second representation.

37. The method of claim 36 including determining whether the first representation includes only a where variable and in such case using the second representation as the third representation and inserting the where variable into the second representation.

38. The method of claim 36 including determining whether the first representation has only a select variable and if so, using the second representation as the third representation and inserting the select variable into the second representation.

39. The method of claim 36 including determining whether neither a where or a select variable is contained in the first representation and in such case, making the third representation the same as the second representation.

* * * * *